United States Patent [19]
Kiene et al.

[11] Patent Number: 5,375,475
[45] Date of Patent: Dec. 27, 1994

[54] DEVICE TO MEASURE THE FLOWRATE IN A PARTIALLY FULL LINE

[75] Inventors: Wilfried Kiene, Munden; Peter Nissen, Rosdorf, both of Germany

[73] Assignee: Fischer & Porter Company, Warminster, Pa.

[21] Appl. No.: 940,002

[22] Filed: Sep. 3, 1992

[30] Foreign Application Priority Data

Sep. 10, 1991 [EP] European Pat. Off. ........ 91115311.2

[51] Int. Cl.$^5$ .............................................. G01F 1/58
[52] U.S. Cl. ............................ 73/861.15; 73/861.12; 73/861.16
[58] Field of Search ........... 73/861.12, 861.15, 861.08, 73/170.11, 861.16

[56] References Cited

U.S. PATENT DOCUMENTS

| 3,805,768 | 4/1974 | Barefoot et al. | 73/861.12 |
| 3,981,190 | 9/1976 | Vidmantas | 73/861.12 |
| 4,137,767 | 2/1979 | Wada | 73/861.15 |
| 4,253,340 | 3/1981 | Schmoock | 73/861.12 |

FOREIGN PATENT DOCUMENTS

| 7328762 | 3/1975 | France . | |
| 1498319 | 11/1969 | Germany . | |
| 2036792 | 7/1972 | Germany . | |
| 2856240 | 7/1980 | Germany . | |
| 9103046 | 7/1991 | Germany . | |
| 2064130 | 6/1981 | United Kingdom | 73/861.15 |
| 381898 | 8/1973 | U.S.S.R. | 73/861.15 |

Primary Examiner—Richard E. Chilcot, Jr.
Assistant Examiner—Elizabeth L. Dougherty
Attorney, Agent, or Firm—Ratner & Prestia

[57] ABSTRACT

Device to measure the flowrate of a fluid flowing in a partially full line, such as a canal or open channel, with coils arranged above and below the partially full line to generate a magnetic field extending essentially vertically through the partially full line and with electrodes arranged opposite each other on opposite lateral walls of the partially full line. An excitation circuit excites the coils and an evaluation circuit processes the potential difference at the electrodes resulting from the magnetic field and the fluid flow to produce a flowrate proportional signal. The device is characterized by a bridge which spans the partially full line and on which the upper coil is positioned with the vertical axis of the upper coil extending through the central region of the bridge.

10 Claims, 2 Drawing Sheets

DEVICE TO MEASURE THE FLOWRATE IN A PARTIALLY FULL LINE

BACKGROUND OF THE INVENTION

The present invention relates to a device to measure the flowrate of a fluid flowing in a partially full line, such as a canal or open channel, which has (1) coils arranged above the partially full line and below the bottom of the partially full line to generate a magnetic field essentially vertical to the partially full line, (2) electrodes arranged on the opposite walls of the partially full line opposite to each other, (3) an excitation circuit for the coils, and (4) an evaluation circuit which processes the potential difference at the electrodes resulting from the magnetic field and the fluid flow and which produces a signal proportional to the flowrate of the fluid flowing through the partially full line.

A known device of this type, described in DE-OS 20 63 792, has coils with horizontal axes which are located on the sides of the walls of the partially full line and which, when energized with opposing polarities, generate a magnetic field which is essentially perpendicular to the middle of the partially full line. Such a device is costly because of the requirement for the coils to be located on the walls of the partially full line. Also, this device does not produce a magnetic field distribution which results in a strong and easily evaluated flow signal in the partially full line.

SUMMARY OF THE INVENTION

An object of the present invention is to provide a device to measure the flowrate in a partially full line which can be built with minimum expenditure and develops a better flow signal representative of the flow of the fluid.

This object is achieved by a bridge which spans a line through which unpressurized liquid flows and a coil positioned on the bridge on a vertical axis which extends through the central region of the bridge. The line has two lateral walls disposed opposite each other and a bottom. A second coil is positioned below the bottom of said line. The coils are part of magnetic field generating means which, when excited, generate a magnetic field which passes essentially vertically through the line. First and second electrode pairs, positioned on the lateral walls of the line, develop signals resulting from charges in the liquid passing through the magnetic field. The electrodes of each pair are disposed opposite each other. An evaluation circuit processes the signals developed by the first and second electrode pairs and corrects these signals by empirical parameters to develop an output signal corresponding to the flowrate of the liquid flowing through the line.

The arrangement of a coil on the bridge results in the generation of a magnetic field distribution which leads to an especially good signal to evaluate and which requires less expenditure than the known device described above.

The device of the present invention is especially useful when the cross section of the partially full line is rectangular, oval with a vertical major axis, or egg shaped with the pointed end directed downward.

In order to appropriately adapt this device to the partially full line, it is preferred to provide an electrically insulating layered non-magnetic material form piece containing the electrodes.

In order to reduce the energy consumption and installation costs of the coils, a magnetically permeable material is located between and around the coils and around both outer sides of the partially full line and forms the bridge providing a magnetic return path.

The invention will be described in the following example with reference to the drawings.

DETAILED DESCRIPTION OF THE INVENTION

Figure 1:
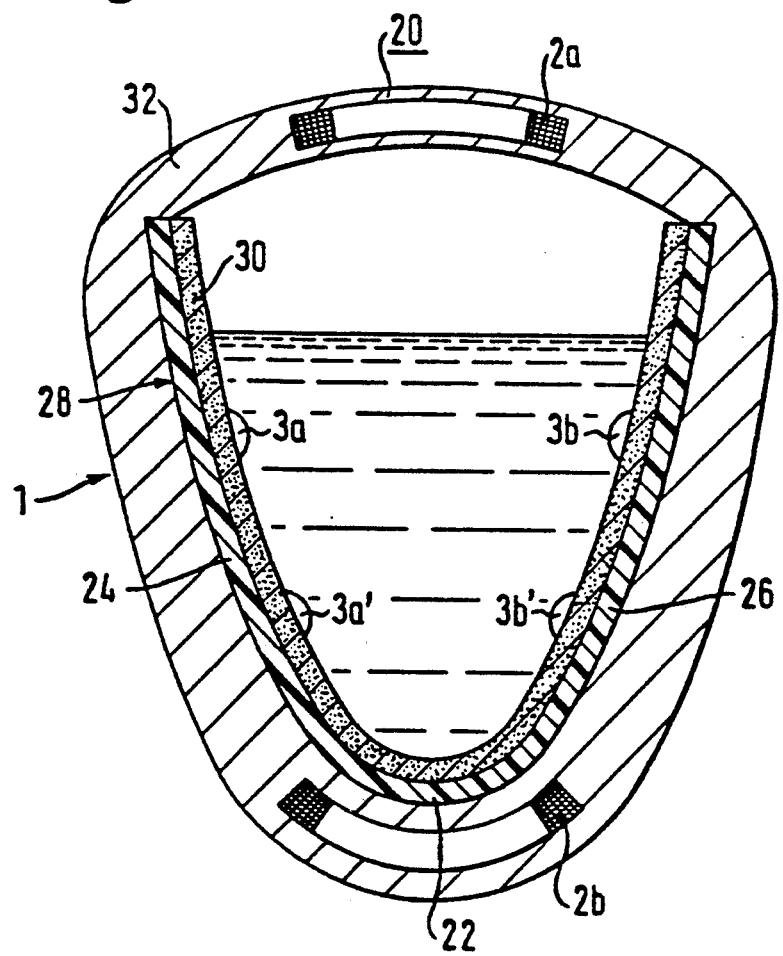
FIG. 1 shows a section through the partially full line with a bridge constructed in accordance with the present invention.
Figure 2:
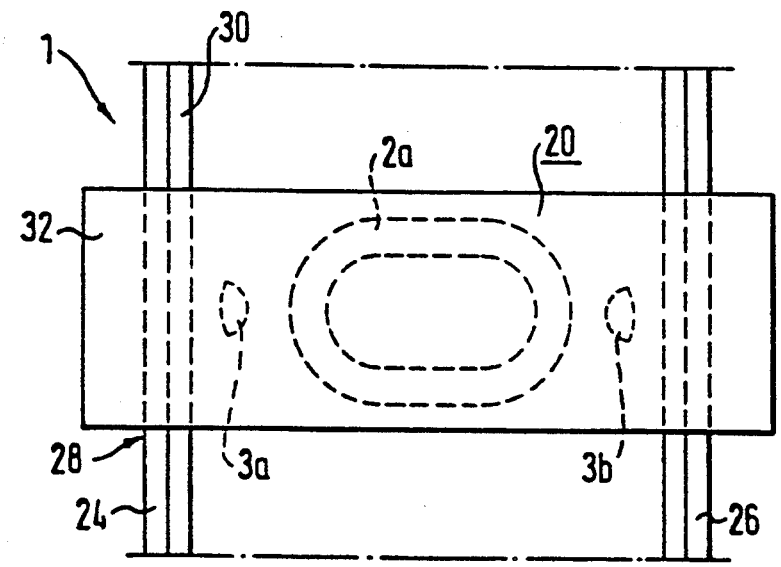
FIG. 2 shows a top view of a section of the partially full line containing the section shown in FIG. 1.

Referring to the drawings, flowrate measuring apparatus, constructed in accordance with the present invention, is used to measure the flowrate of the unpressurized liquid flow in a partially full line 1. The cross section of the partially full line 1 is egg shaped with its pointed end directed downward so that when the flowrate is relatively small, a useable fluid level will still exist. Coils 2a, 2b, respectively, are arranged above the partially full line 1 and below the bottom 22 of the partially full line 1 to generate a magnetic field essentially vertical in the partially full line 1. Coil 2a is positioned on a bridge 20 which spans line 1 on a vertical axis which extends through the central region of the bridge. The line also has two lateral walls 24 and 26 disposed opposite each other. For the embodiment of the invention illustrated in FIG. 1, bridge 20 and line 1 are formed as a unitary structure.

Two pairs of electrodes 3a, 3b; 3a', 3b' are arranged on the walls 24, 26 of the partially full line 1 opposite to each other. The coils 2a, 2b are provided with an excitation circuit in the form of off/reversing switches 4, 5. With this excitation circuit 4, 5, which operates in conjunction with an evaluation circuit which is fully illustrated in FIG. 3, a signal is produced from the potential difference at the electrodes 3a, 3b; 3a', 3b' resulting from the fluid flow through the magnetic field.

The partially full line 1, in the region of the coils 2a, 2b and the electrodes 3a, 3b; 3a', 3b', contains a form piece 28 made of a non-magnetic material, plastic, or concrete whose inner surface is covered with an electrically insulating layer 30. The electrodes 3a, 3b; 3a', 3b are located on the inner side of the electrically insulating layer 30 and have extensions which extend through the insulating layer 30 and the form piece 28.

Between and around the coils 2a, 2b and around both sides of the partially full line 1, there are magnetically permeable materials 32 to provide a magnetic flux return path.

Figure 3:
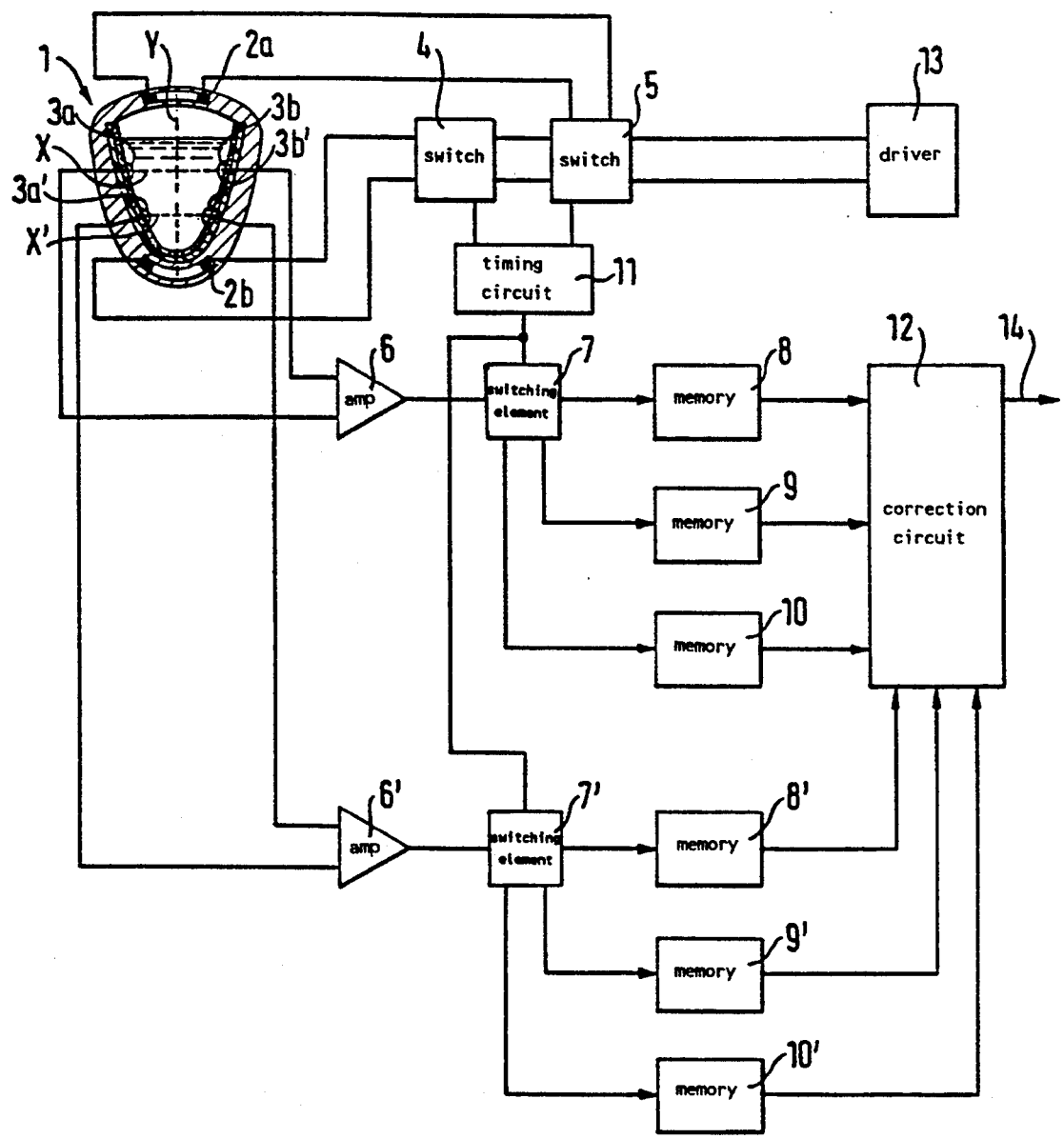
FIG. 3 shows a block diagram of the circuit for the device constructed in accordance with the present invention.

FIG. 3 shows a partially full line 1 and two coils 2a, 2b to generate an essentially symmetrical vertical magnetic field in the partially full line 1. Two electrodes 3a, 3b, to measure the charge displacement in the fluid flowing in the partially full line 1, are located so that the imaginary line X connecting their centers extends diametrically through the partially full line 1 and is essentially perpendicular to the imaginary center line Y connecting the coils 2a, 2b. The coils 2a, 2b are connected by off/reversing switches 4, 5 to a driver circuit 13.

Through appropriate changes in the circuit, the coils 2a, 2b can be placed in series and to change the excitation in coil 2a or coil 2b an additional winding can be added on coil 2a or coil 2b which can be energized in a polarity which opposes the polarity of the main winding. The electrodes 3a, 3b are connected to an amplifier 6 whose output is fed to a signal switching element 7. A timing circuit 11 switches the off/reversing switches 4, 5 in synchronization with the output signals from the signal switching element 7, which can be stored, for example, in memory 8 when the polarity of electromagnets 2a, 2b is aiding, in memory 9 when the polarity of electromagnets 2a, 2b is opposing, and in a memory 10 when electromagnet 2b is deenergized. The signals stored in memories 8, 9, 10 are processed through the use of empirical parameters in correction circuit 12 so that at output 14 of the correction circuit 12 a signal is developed, which is essentially free of the disturbances of the flow profile in the partially full line, especially deviations from axisymmetry of the flow profile.

The present invention operates on the principle that an inductive flowmeter indicates a different measured value when the line is partially full. Therefore, two additional electrodes $3a'$, $3b'$, which respond to the charge displacements in the fluid, are located below electrodes 3a, 3b, so that the imaginary line $X'$, connecting the centers of electrodes $3a'$, $3b'$, extends essentially across the partially full line 1 and is essentially perpendicular to the imaginary center line Y connecting the coils 2a, 2b. The timing circuit 11 switches a second signal switching element $7'$ whose signal comes from the amplifier $6'$ connected to the electrodes $3a'$, $3b'$ and is fed to a second memory bank $8'$, $9'$, $10'$. The signals stored in memories $8'$, $9'$, $10'$ are also processed through the use of empirical parameters in correction circuit 12 to produce an output signal at output 14.

A common pair of electromagnets 2a, 2b are provided for the signal switching element 7, $7'$ in the arrangement shown in FIG. 3.

With the potentials which exist at the electrodes 3a, 3b and at electrodes $3a'$, $3b'$ and possibly other electrodes, the fluid level in the partially full line 1 can be determined.

With the electrode pairs associated with the different memories (i.e. electrode pair 3a, 3b associated with memory bank 8, 9, 10 and electrode pair $3a'$, $3b'$ associated with memory bank $8'$, $9'$, $10'$) and the different coil excitation conditions associated with the particular memories within each memory bank, different signal combinations are developed and stored in a prescribed manner. With individual inputs to correction circuit 12 from the different memories and the conditions under which these inputs were developed being known (i.e. which electromagnet is excited and when and which electrode pair develops the signals and when), the correction circuit can distinguish between the different inputs and determine the flow rate. This is accomplished by correlating the inputs, between which the correction circuit can distinguish, with empirical parameters associated with the flowmeter based on actual measurements and observations of the flowmeter and experience with the flowmeter and which bear on the flowrate measurements. The signals developed by the electrode pairs, under different excitation conditions of the coils, are processed with regard to the empirical parameters, to develop the output signal from the correction circuit.

By way of example, a particular flow measuring apparatus, generally similar to the present invention, has been calibrated for various partial fillings of the line. For electrode pair 3a, 3b, the measured value set into memory 8 was multiplied in the correction circuit by a correction factor taken from a "correction factor v. input variable" curve, with the input variable being the ratio of the measured values set into memories 9 and 10. In other words, when the particular ratio of the measured values set into memories 9 and 10 is actually experienced during operation of the flow measuring apparatus, the particular measured value set into memory 8 is multiplied by a correction factor corresponding to the particular ratio of the measured values set into memories 9 and 10, the correction factor having been established previously by actual measurements and observations of the flow measuring apparatus and experience with the flow measuring apparatus bearing on the flowrate characteristics.

What is claimed:

1. A liquid flowrate measuring device comprising:
   a line through which unpressurized liquid flows and having:
   (a) a bridge spanning said line,
   (b) two lateral walls disposed opposite each other, and
   (c) a bottom wall;
   magnetic field generating means, including:
   (a) a first coil positioned within said bridge of said line and having a vertical axis extending through the central region of said bridge,
   (b) a second coil positioned within said bottom wall of said line
   for generating a magnetic field passing essentially vertically through said line;
   means for exciting said first and said second coils;
   first and second electrode pairs positioned on said lateral walls of said line and responsive to electric charges in the liquid flowing in said line for sensing electric charges passing through said magnetic field and for developing signals resulting from the electric charges passing through said magnetic field, the electrodes of each pair disposed opposite each other;
   and an evaluation circuit for processing said signals developed by said first and said second electrode pairs and for correcting said signals developed by said first and said second electrode pairs by empirical parameters to develop an output signal corresponding to the flowrate of the liquid flowing through said line.

2. A device according to claim 1 wherein the cross section of said line is egg shaped with the pointed end directed downward.

3. A device according to claim 1 wherein said line has an electrically insulating layered non magnetic material form piece lining the inside of said line and containing said electrodes.

4. A device according to claim 1 wherein said line has magnetically permeable material between and around said coils, including said bridge, to provide a magnetic return path.

5. A liquid flowrate measuring device comprising:
   an open top line through which unpressurized liquid flows and having:
   (a) two lateral walls disposed opposite each other, and
   (b) a bottom wall;

a bridge spanning said line;
magnetic field generating means, including:
- (a) a first coil positioned within said bridge and having a vertical axis extending through the central region of said bridge,
- (b) a second coil positioned within said bottom wall of said line for generating a magnetic field passing essentially vertically through said line;

means for exciting said first and said second coils;

first and second electrode pairs positioned on said lateral walls of said line and responsive to electric charges in the liquid flowing in said line for sensing electric charges passing through said magnetic field and for developing signals resulting from the electric charges passing through said magnetic field, the electrodes of each pair disposed opposite each other;

and an evaluation circuit for processing said signals developed by said first and said second electrode pairs and for correcting said signals developed by said first and said second electrode pairs by empirical parameters to develop an output signal corresponding to the flowrate of the liquid flowing through said line.

6. A device according to claim 5 wherein said line and said bridge are a unitary structure.

7. Device to measure the flowrate of a fluid flowing in a partially full line, such as a canal or open channel, with a first coil arranged above the partially full line and a second coil within a bottom wall of the partially full line to generate a magnetic field essentially vertical to the partially full line and with electrodes arranged on the walls opposite to each other of the partially full line and with an excitation circuit for the coils and with an evaluation circuit to process the potential differences at the electrodes resulting from the magnetic field and the fluid flow which produces a flowrate proportional signal, further including a bridge which spans the partially full line and in whose central region the partially full line the coil above the partially full line with vertical axis is positioned within the bridge.

8. Device in accordance with claim 7 characterized by the cross section of the partially full line being rectangular, oval with a vertical major axis, or egg shaped with the pointed end directed downward.

9. Device in accordance with claim 8 characterized by an electrically insulating layered non-magnetic material form piece containing the electrodes positioned in the area of the electrodes and the coil within the bottom wall of the partially full line.

10. Device in accordance with claim 9 characterized by magnetically permeable material being located between and around the coils and around both outer sides of the partially full line and being used to form the bridge in order to provide a magnetic return path.

* * * * *